United States Patent
Inoue et al.

(10) Patent No.: US 7,698,595 B2
(45) Date of Patent: Apr. 13, 2010

(54) DRIVING METHOD OF STORAGE APPARATUS AND DISK SUBSYSTEM INCLUDING SUCH STORAGE APPARATUS

(75) Inventors: Tetsuya Inoue, Odawara (JP); Hiroshi Suzuki, Sagamihara (JP); Masahiro Sone, Numadu (JP); Yousuke Kawakubo, Odawara (JP); Toshiyuki Nagamori, Odawara (JP)

(73) Assignee: Hitachi, Ltd., Chiyoda-Ku, Tokyo (JP)

( * ) Notice: Subject to any disclaimer, the term of this patent is extended or adjusted under 35 U.S.C. 154(b) by 702 days.

(21) Appl. No.: 11/437,714

(22) Filed: May 22, 2006

(65) Prior Publication Data
US 2007/0260917 A1 Nov. 8, 2007

(30) Foreign Application Priority Data
Apr. 7, 2006 (JP) ............................. 2006-106877

(51) Int. Cl.
*G06F 11/00* (2006.01)
*G06F 11/32* (2006.01)
*G06F 1/30* (2006.01)

(52) U.S. Cl. ................................. 714/14; 714/57; 361/6
(58) Field of Classification Search .................. 714/14, 714/57; 361/6, 7, 434, 435, 622, 662; 307/85
See application file for complete search history.

(56) References Cited

U.S. PATENT DOCUMENTS

| | | | | |
|---|---|---|---|---|
| 5,325,363 | A * | 6/1994 | Lui | 714/6 |
| 5,557,738 | A * | 9/1996 | Townsley et al. | 714/14 |
| 5,774,736 | A | 6/1998 | Wright et al. | |
| 5,842,030 | A * | 11/1998 | Larabell et al. | 713/340 |
| 5,881,215 | A * | 3/1999 | Alft | 714/14 |
| 6,629,045 | B2 * | 9/2003 | Chao et al. | 702/60 |
| 6,757,774 | B1 * | 6/2004 | Benson et al. | 710/305 |
| 6,795,934 | B2 * | 9/2004 | Nagata et al. | 714/8 |
| 6,993,680 | B2 * | 1/2006 | Fukumori | 714/14 |
| 7,023,642 | B2 | 4/2006 | Suzuki et al. | |
| 7,152,175 | B2 * | 12/2006 | Madany et al. | 713/340 |
| 7,334,158 | B2 * | 2/2008 | Bibikar et al. | 714/14 |

(Continued)

FOREIGN PATENT DOCUMENTS

EP 1 411 523 A2 6/2003

(Continued)

OTHER PUBLICATIONS

Wikipedia's Circuit Breaker version from Mar. 31, 2006 http://en.wikipedia.org/w/index.php?title=Circuit_breaker&oldid=46320672.*

(Continued)

*Primary Examiner*—Scott T Baderman
*Assistant Examiner*—Joseph Schell
(74) *Attorney, Agent, or Firm*—Foley & Lardner LLP

(57) ABSTRACT

Provided is a highly reliable storage apparatus for supplying power to a plurality of memory mediums. This storage apparatus has a plurality of hard disks separately disposed in groups of eight; a plurality of power supply units for supplying power to each of the eight hard disks belonging to each group; and a redundant power supply unit connected in parallel with each power supply unit, wherein power is supplied from the redundant power supply unit to the eight hard disks connected to the power supply unit subject to a malfunction during such malfunction among the plurality of power supply units.

3 Claims, 7 Drawing Sheets

U.S. PATENT DOCUMENTS

| | | | |
|---|---|---|---|
| 7,500,120 B2 * | 3/2009 | Egan et al. | 713/300 |
| 2004/0177283 A1 | 9/2004 | Madany et al. | |
| 2005/0114715 A1 * | 5/2005 | Sone | 713/300 |
| 2005/0160311 A1 * | 7/2005 | Hartwell et al. | 714/7 |
| 2005/0182981 A1 * | 8/2005 | Hayashi | 713/320 |
| 2005/0240814 A1 * | 10/2005 | Sasakura et al. | 714/14 |
| 2005/0268164 A1 * | 12/2005 | Hara | 714/14 |
| 2006/0190747 A1 * | 8/2006 | Fukumori | 713/300 |
| 2007/0205664 A1 | 9/2007 | Kawakubo et al. | |

FOREIGN PATENT DOCUMENTS

| | | |
|---|---|---|
| JP | 2005-173941 | 12/2003 |
| WO | WO 97/11426 | 9/1996 |

OTHER PUBLICATIONS

Method and System for Backing Up Power Supply of Disk Array Device EP 1 361 516 A2 by Fukumori and Mitsuo Published Nov. 12, 2003.*

* cited by examiner

DRIVING METHOD OF STORAGE APPARATUS AND DISK SUBSYSTEM INCLUDING SUCH STORAGE APPARATUS

CROSS-REFERENCES TO RELATED APPLICATIONS

This application relates to and claims priority from Japanese Patent Application No. 2006-106877, filed on Apr. 7, 2006, the entire disclosure of which is incorporated herein by reference.

BACKGROUND

The present invention generally relates to a power supply system of supplying power to recording mediums housed in a storage apparatus, and in particular relates to a storage apparatus having a redundant power source and a disk subsystem including such storage apparatus for improving the reliability in supplying power.

In recent years, pursuant to the development of information society, capacity of a disk subsystem including a magnetic disk apparatus as the storage apparatus is increasing year by year, and the number of loaded disks is also increasing. Meanwhile, in addition to the miniaturization and price reduction of apparatuses configuring the disk subsystem, higher reliability particularly in the steady supply of power or secure protection of data is being demanded. Accordingly, it is desirable that these apparatuses are configured as described below.

(1) In order to securely store data in hard disks, increase the number of hard disks to be loaded and housed in the disk subsystem, and increase the number of hard disks to be connected to the same motherboard and power source.

(2) In order to enable the normal operation of apparatuses configuring the disk subsystem even during a power source failure, connect the power source or power source cable for supplying power to the apparatuses in duplication or in a redundant configuration.

(3) In order to realize non-disruptive maintenance, internally provide various detection report circuits in the apparatuses so as to detect and report a failure when such failure occurs in the power source of an operating apparatus.

As a magnetic disk apparatus including a system for improving the reliability of the power source, conventionally, a disk subsystem configured from a hard disk control logical unit and a disk unit has been proposed. This disk subsystem is configured to supply power to hard disks with two or more power sources mounted at each power source boundary (backboard). Each of the mounted power sources has sufficient output capacity for driving all hard disks so that the operation of the apparatuses will not be influenced even when one power source malfunctions and the output thereof is stopped. Further, each power source is configured so that two independent power source facilities can be connected so as to enable the operation even during a power source failure in a power source facility.

Further, when the output voltage is stopped due to a malfunction in the power source, each power source reports such malfunction of the power source to the power supply malfunction detection unit. Moreover, a power supply malfunction detection unit checks the voltage of the power source voltage to be provided to the hard disks, and such power supply malfunction detection unit detects a malfunction when the voltage falls below an operable voltage of the hard disks, and reports the malfunction of the power source to the hard disk control logical unit.

Further, there is a disk subsystem that is configured such that power can be separately supplied from the power source to the backboard based on the two or more power sources mounted in the apparatus, the hard disks have separate power sources, the power sources are input from two types of inputs on the backboard, and which adopts a power supply system of supplying power to the hard disks with a single output (refer to Japanese Patent Laid-Open Publication No. 2005-173941).

SUMMARY

Nevertheless, in the foregoing conventional examples, although a redundant configuration is realized by loading two power sources set to the same output power source volume in each backboard, since the mutual outputs are OR-connected on the backboard, when a short circuit occurs inside the backboard or hard disk, both power sources will fail and the system will shut down. Further, since numerous hard disks are loaded on the backboard, each power source is provided with sufficient electrical capacity to supply power to all of the loaded hard disks. Thus, when a short circuit failure occurs, there is a possibility that an extremely large current will flow, and a reinforced power supply line is necessary in order to prevent a burnout in such a case. This will be detrimental to the miniaturization of the wiring and power source.

In addition, when mounting and OR-connecting the power sources set to the same output power source voltage at separate positions, it is not possible to match the impedance of the power supply wiring to the memory mediums to become the load from each power source. Thus, it is not possible to fixedly supply the power to be consumed by the memory mediums from a single power source, and power will be supplied from one or more power sources due to the power fluctuation generated from differences in the operational status of the memory mediums. Thus, it is not possible to uniquely decide the power source to supply the power, and the generation of noise cannot be prevented.

Further, with the adoption of a redundant configuration of mounting two identical power sources having an electrical capacity corresponding to the number of hard disks to be mounted, for instance, waste of the power source capacity is much larger in comparison to a case of providing one redundant power source to a plurality of power sources or mounting one power source having the electrical capacity corresponding to the number of loaded hard disks and mounting another power source having a smaller electrical capacity. Since one power source supplies power to all hard disks mounted on the backboard, for instance, one power source will be required even when housing only one hard disk, there will be much waste in the power source capacity, and it is not possible to seek the optimization of the power source capacity in relation to the number of hard disks.

Further, the with invention described in Japanese Patent Laid-Open Publication No. 2005-173941 above, since the hard disk and power source are connected one-to-one and configure a single unit in the disk subsystem, when either the power source or hard disk is subject to a failure, it is necessary to replace both, and there is much waste of components.

Further, since the hard disk and power source are connected one-to-one to configure a single unit and a redundant power source is not loaded in the power source, when there is a failure in the power source of the unit, there is a drawback in that the apparatus becomes inoperable. Moreover, although the hard disk and power source are configured as a single unit and the operational status of the hard disk is indicated with the flashing speed or color of the LED (light-emitting diode) loaded in the hard disk power source, since it is not possible to control the status display LED when there is a failure in the hard disk DC/DC power source, there is a possibility that the maintenance worker would make a maintenance error during the maintenance and replacement of the hard disk canister.

The present invention was devised in view of the foregoing problems, and an object thereof is to improve the reliability upon supplying power to a plurality of memory mediums.

In order to achieve the foregoing object, the present invention provides a storage apparatus, including: a plurality of memory mediums separately disposed in groups; a memory medium driver for driving each of the memory mediums; a plurality of power supply units disposed in correspondence with each of the groups for supplying power to each memory medium group belonging to each of the groups; and a redundant power supply unit connected in parallel with each of the power supply units with a memory medium group belonging to any one of the groups as the power supply target.

According to this storage apparatus, it is possible to improve the reliability upon supplying power to the memory mediums since the storage apparatus supplies power from the redundant power supply unit to the memory medium group connected to a power supply unit subject to a malfunction during the malfunction in any one of the plurality of power supply units.

Further, according to the storage apparatus pertaining to the present invention, as a result of the output voltage of the redundant power supply unit being set to be lower than the output voltage of each of the power supply units, it is possible to supply power from the redundant power supply unit to the memory medium group connected to a power supply unit subject to a malfunction during the malfunction in any one of the plurality of power supply units.

According to the present invention, it is possible to improve the reliability in supplying power to the memory mediums, and contribute to the miniaturization and price reduction of the storage apparatus. Further, it is also possible to provide a disk subsystem including a highly reliable power supply apparatus for supplying power.

DETAILED DESCRIPTION

Figure 1:
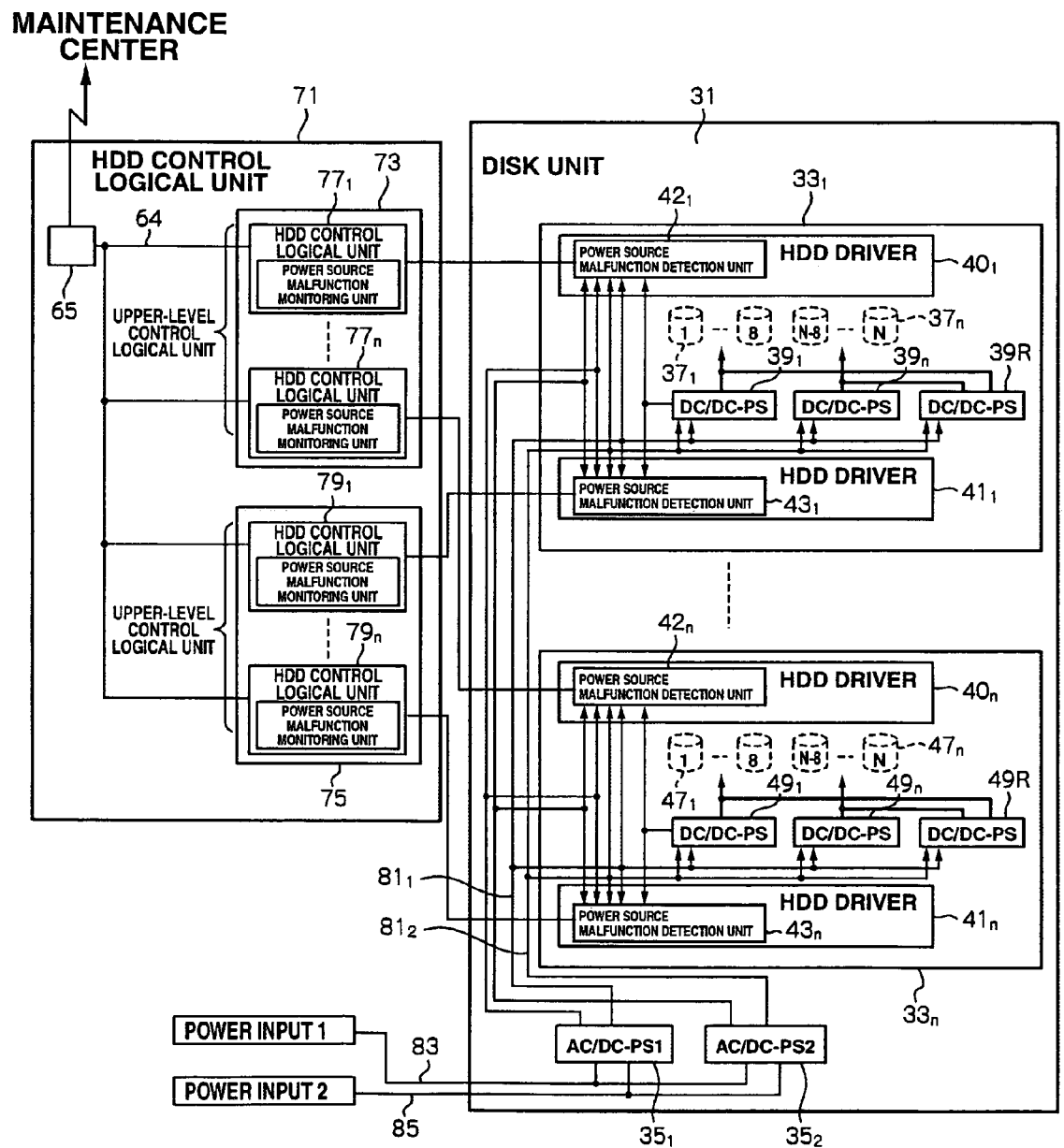
FIG. 1 is a block diagram showing a physical configuration of an embodiment of the data processing system applying the storage system according to the present invention.
Figure 2:
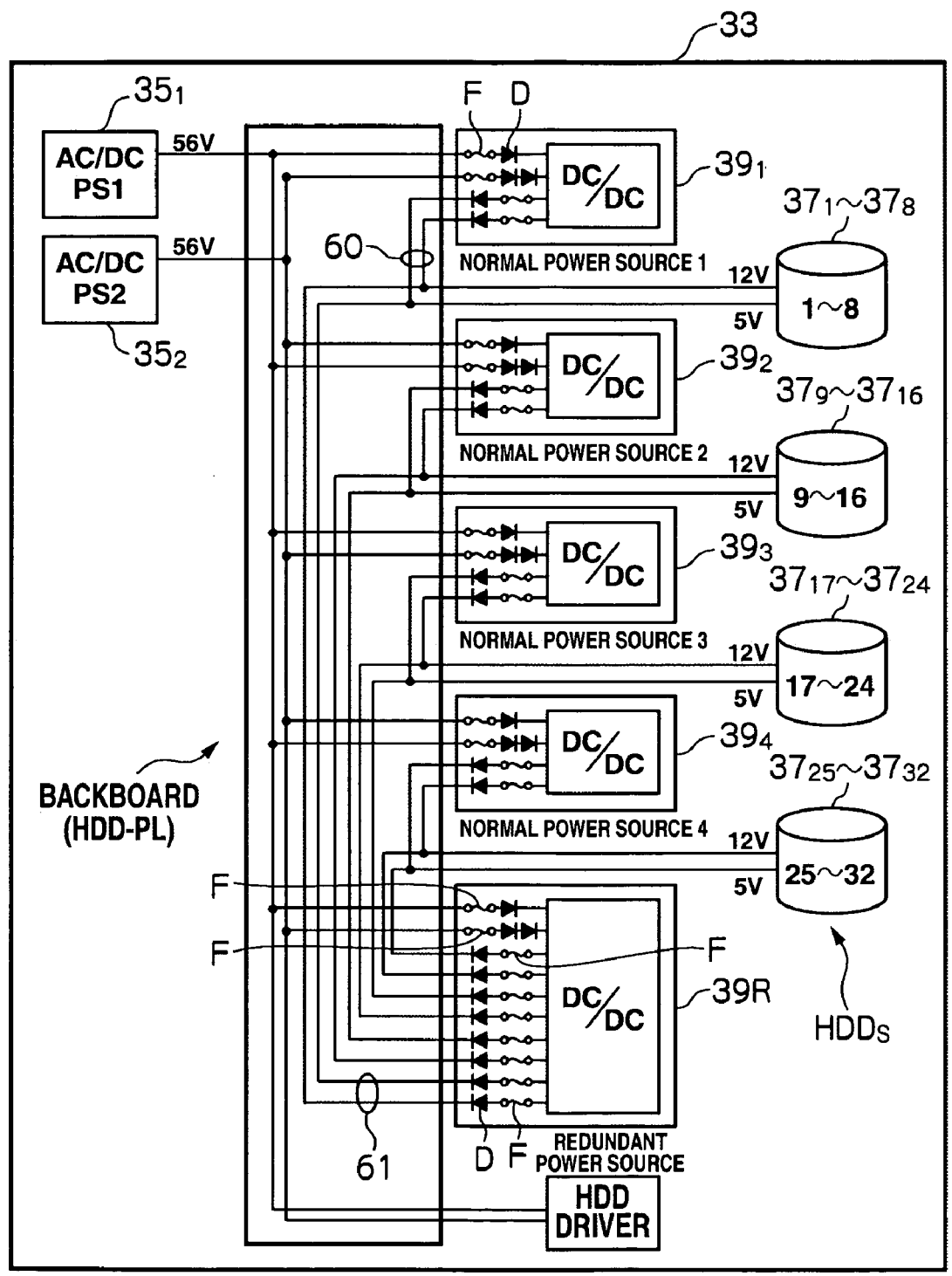
FIG. 2 is a block diagram showing in detail the circuitry of the storage system pertaining to the first embodiment of the present invention.
Figure 3A:
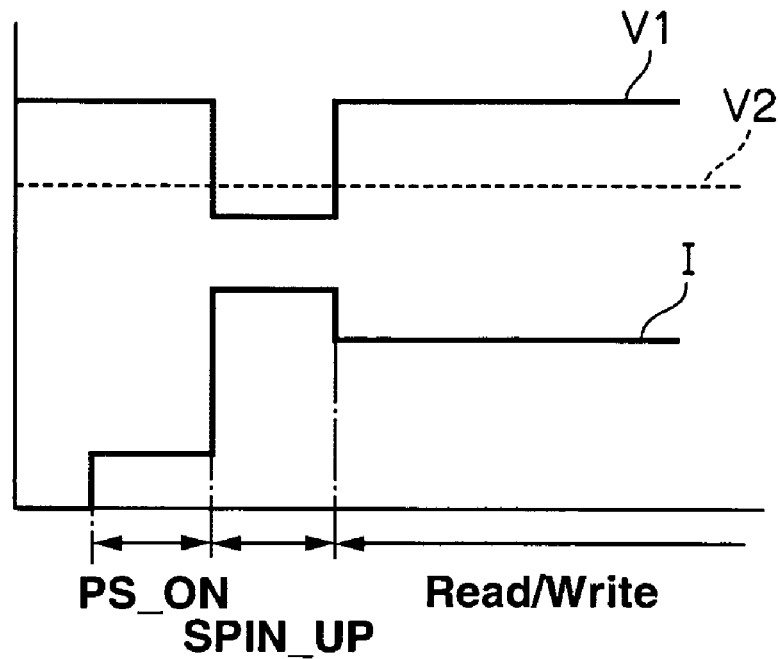
FIG. 3A is a waveform chart for explaining the spin-up operation of only the normal power source.
Figure 3B:
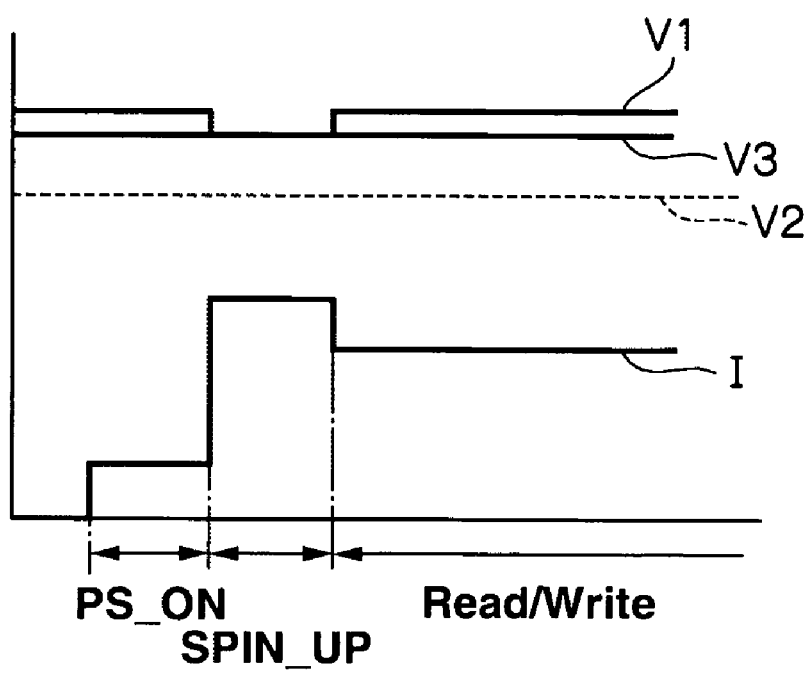
FIG. 3B is a waveform chart for explaining the spin-up operation using the normal power source and redundant power source.
Figure 4:
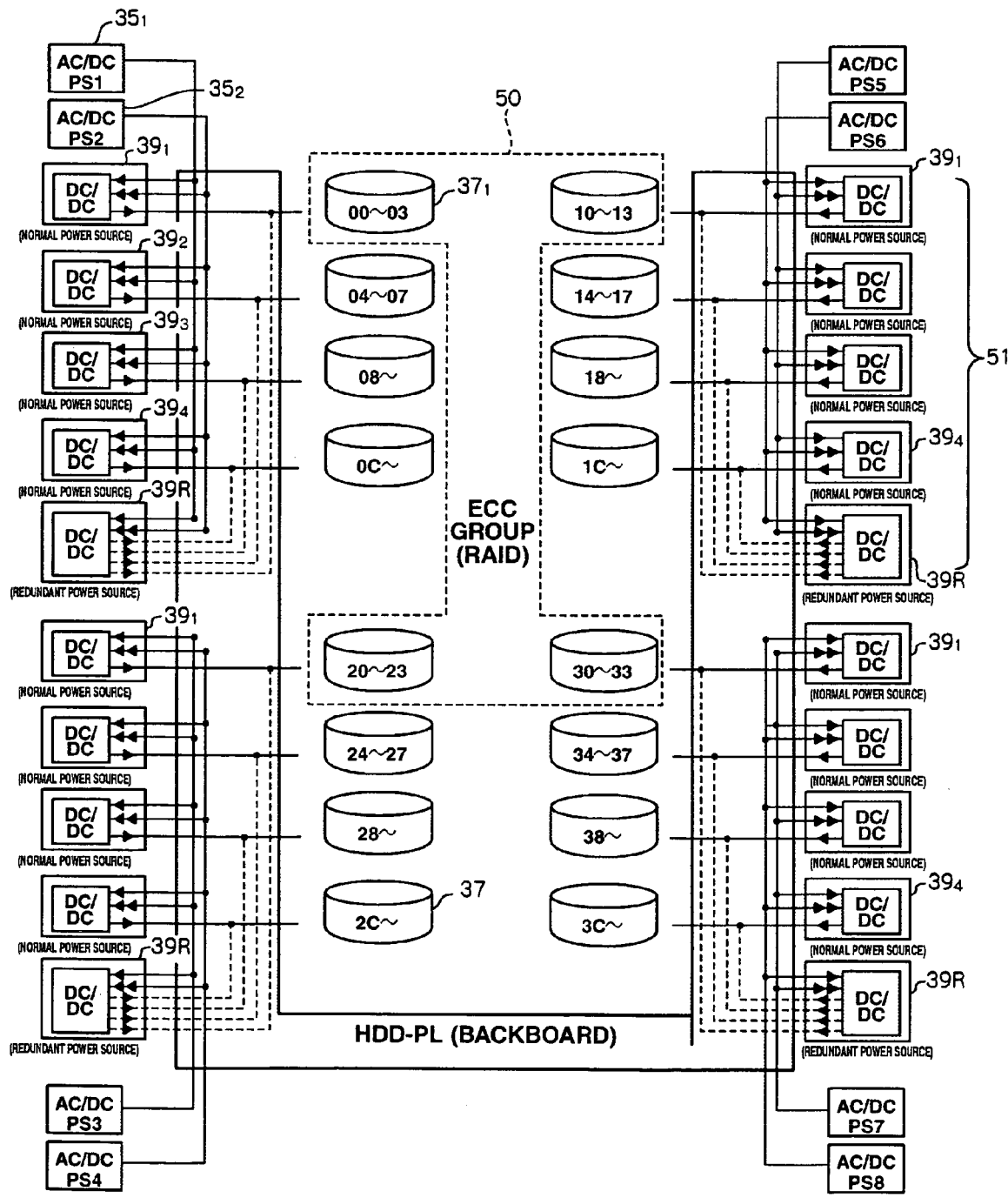
FIG. 4 is a diagram showing a state of creating the ECC group in the disk subsystem.
Figure 5:
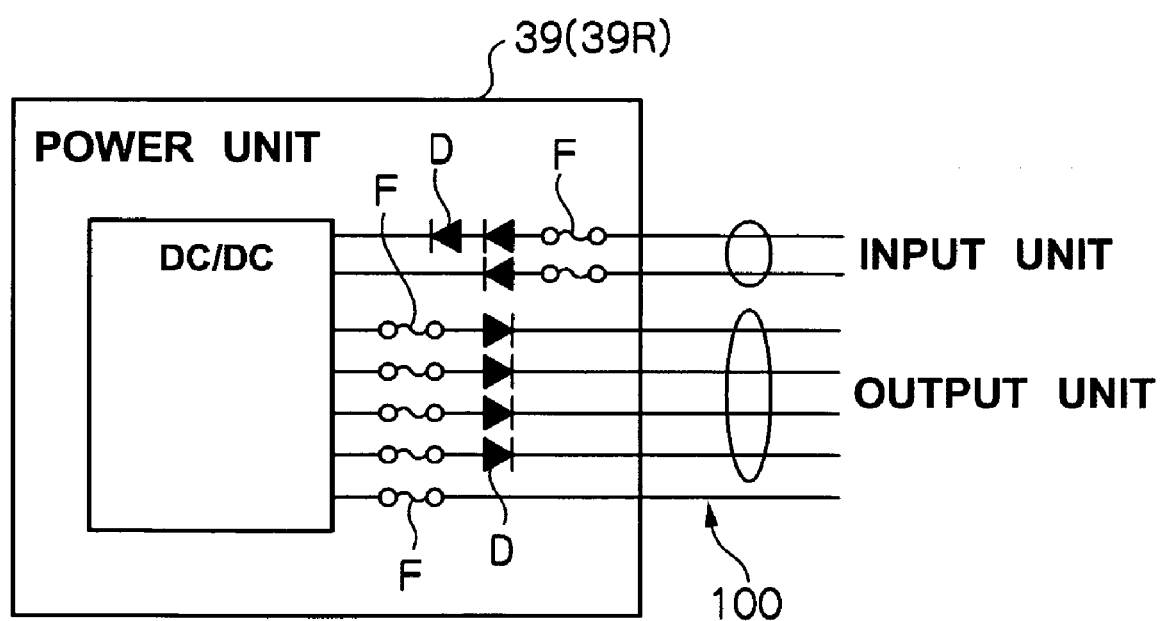
FIG. 5 is a diagram showing a state where the DC/DC converter/power supply unit includes a normal system/redundant system identification bit as an I/O system capable of sending and receiving control signals.
Figure 6:
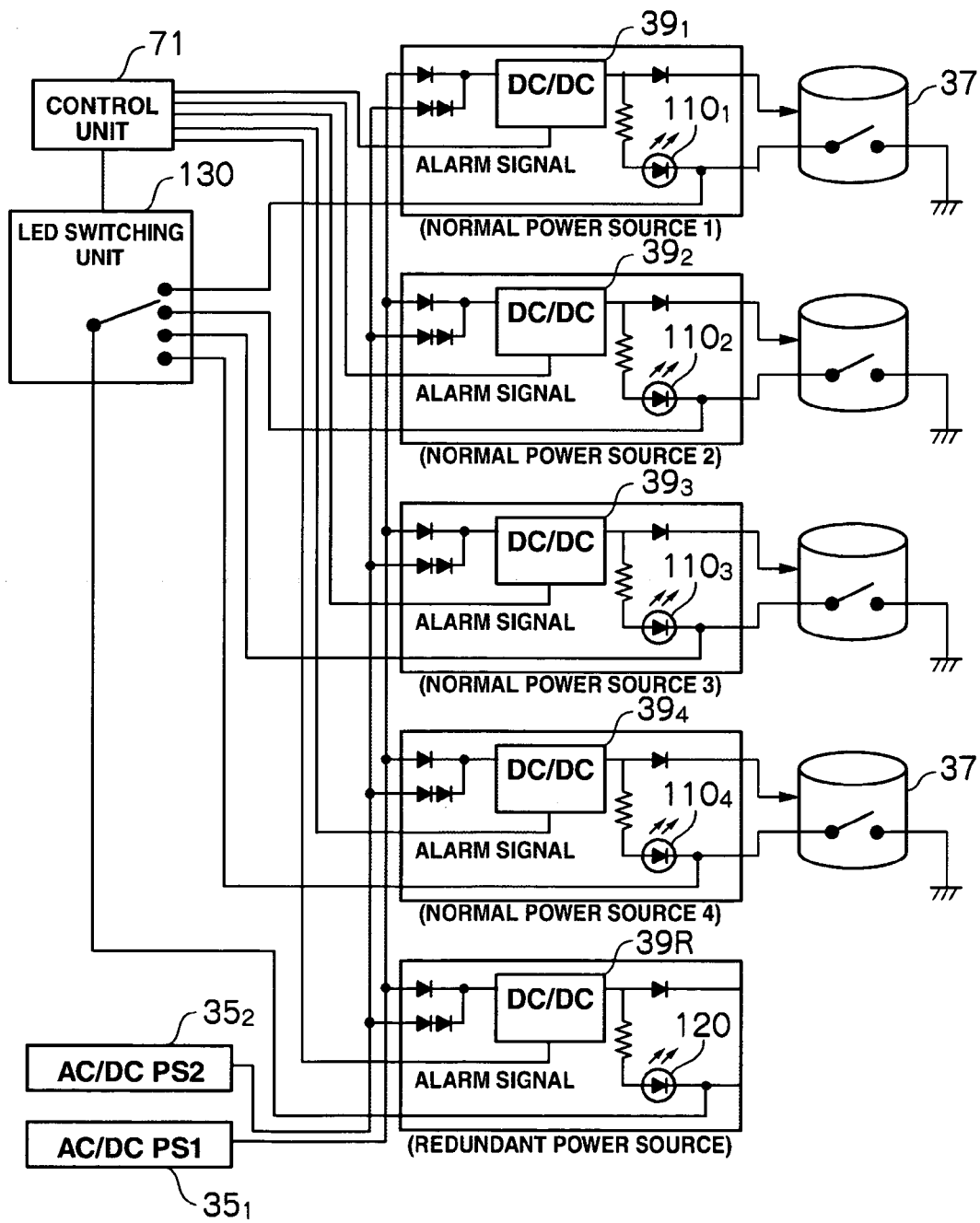
FIG. 6 is a diagram showing a state where hard disk status display light-emitting diodes (LEDs) are individually provided to the respective disk units.
Figure 7:
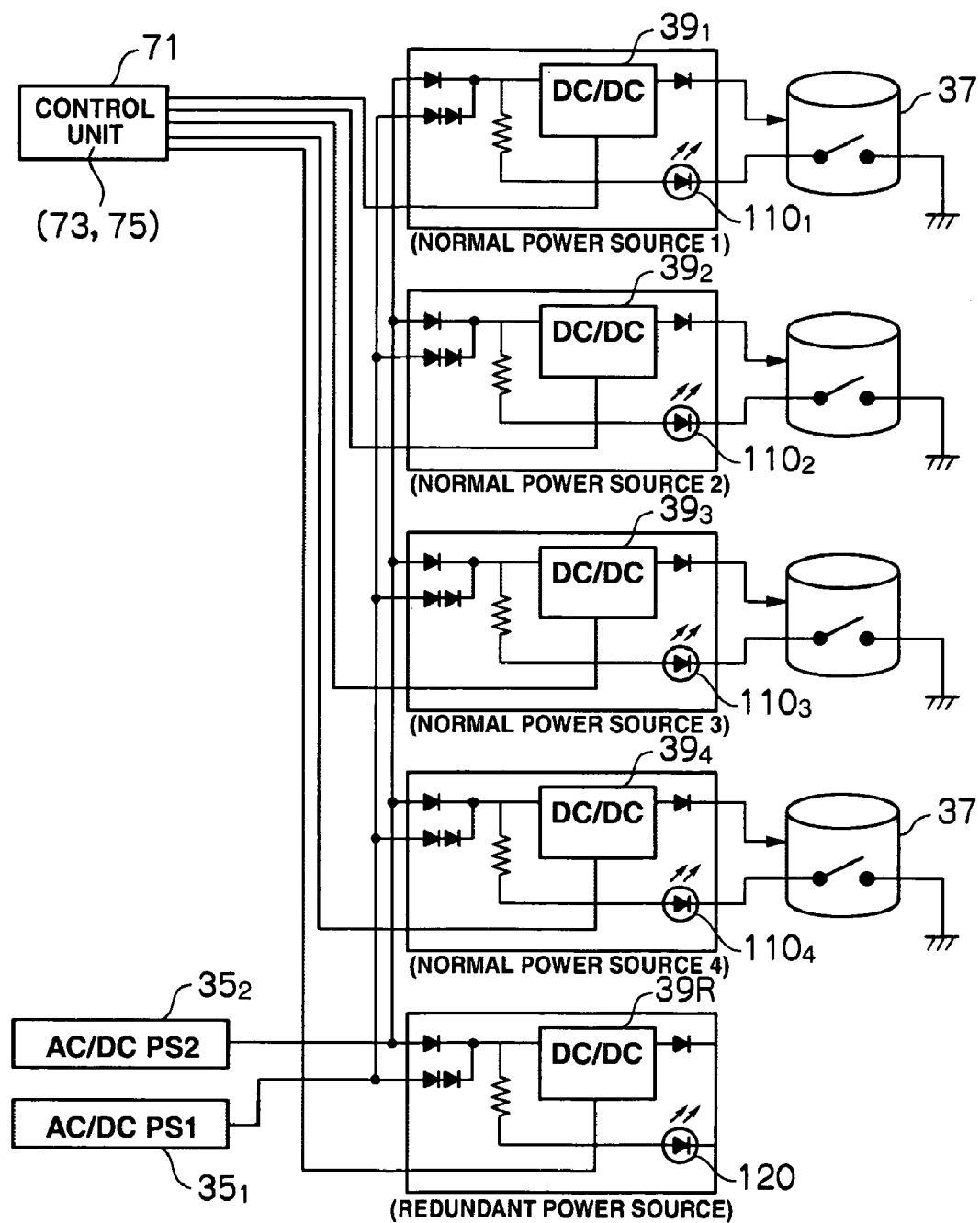
FIG. 7 is a diagram showing a state where hard disk status display light-emitting diodes (LEDs) are individually provided to the respective disk units.

Embodiments of the present invention are now explained with reference to the respective drawings. FIG. 1 is a block diagram showing in detail the circuitry of the disk subsystem (storage system) according to the first embodiment of the present invention; FIG. 2 is a block diagram showing in detail the circuitry of the disk and DC/DC converter/power source supply unit; FIG. 3A is a waveform chart for explaining the spin-up operation of only the normal power source; FIG. 3B is a waveform chart for explaining the spin-up operation using the normal power source and redundant power source; FIG. 4 is a diagram showing a state of creating the ECC group in the disk subsystem; FIG. 5 is a diagram showing a state where the DC/DC converter/power supply unit includes a normal system/redundant system identification bit as an I/O system capable of sending and receiving control signals; and FIG. 6 and FIG. 7 are diagrams showing a state where hard disk status display light-emitting diodes (LEDs) are individually provided to the respective disk units.

As shown in FIG. 1, the disk subsystem according to the present embodiment is primarily configured from a hard disk control logical unit 71 and a disk unit 31. The hard disk control logical unit 71 has identically configured hard disk control logical units 73, 75 so as to control the overall disk subsystem. The hard disk control logical unit 73 is configured by including a plurality of power source malfunction monitoring units $77_1$ to $77_n$, and the hard disk control logical unit 75 is configured by including a plurality of power source malfunction monitoring units $79_1$ to $79_n$, respectively.

As shown in FIG. 1 and FIG. 2, the disk unit (sometimes referred to as a disk array or disk housing unit; hereinafter the same) 31 converts AC power into DC power, and has two or more AC/DC converter/power source supply units 35 for supplying power of a fixed voltage, and, for instance, a plurality of disk units $33_1$ to $33_n$ having the same configuration.

The AC/DC converter/power source supply units $35_1$, $35_2$ respectively have a rectifier circuit for receiving the AC power supplied from the first power source 83 and second power source 85 and converting it into DC power of a prescribed voltage, a smoothing circuit, and so on. These power supply units separately supply power to the DC/DC converter/power source supply unit $39_1$ to $39_n$ on a plurality of backboards provided to the disk units 33.

The respective components configuring the respective disk units $33_1$ to $33_n$ and the respective components configuring the disk control logical unit 71 are explained in detail. Foremost, the respective components configuring the respective disk units $33_1$ to $33_n$ are explained. Since each of the disk units $33_1$ to $33_n$ has the same circuitry, only the circuitry of the disk units $33_1$ will be explained in detail below, and explanation on the circuitry of the remaining disk units $33_2$ to $33_n$ will only be provided as necessary. Thus, the detailed explanation of overlapping portions is omitted.

The disk unit 33 includes, for each backboard, a plurality of hard disks (memory mediums) $37_1$ to $37_n$ disposed in an array for storing data, DC/DC converter/power supply units $39_1$ to $39_n$ for supplying power to the hard disks $37_1$ to $37_n$, and hard disk drivers $40_1$ to $40_n$, $41_1$ to $41_n$ including a plurality of power supply malfunction detection units $42_1$ to $42_n$, $43_1$ to $43_n$. Further, as described later, a redundant DC/DC converter/power source supply unit 39R is additionally provided to a plurality of DC/DC converter/power source supply units 39 at a ratio of one redundant DC/DC converter/power source supply unit 39R for each plurality of DC/DC converter/power source supply units 39.

Here, with the disk units according to this embodiment, a single DC/DC converter/power source supply unit 39 supplies power to eight hard disks upon splitting up and separating the DC/DC converter/power source supply unit 39 and hard disks 37. In other words, a plurality of hard disks are separated into a plurality of groups, eight hard disks belong to each group, and a single DC/DC converter/power source supply unit 39 supplies power to the hard disk group belonging to each group. Like this, by splitting up and separating and the hard disks 37 and DC/DC converter/power source supply unit 39, even if a failure occurs in the hard disks 37 or DC/DC converter/power source supply unit 39, the other will not be affected. As described above, this configuration enables the separate processing of components even when a failure occurs to either the hard disk 37 or DC/DC converter/power source supply unit 39.

The disk unit $33_1$, as shown in FIG. 1, is wired with a first source supply system $81_1$ for supplying power from a first power source 83 and second power source 85 (which supply AC power of 200V or 400V as industrial power) to an AC/DC converter/power source supply unit $35_1$, and the to respective disks ($37_1$ to $37_n$, $47_1$ to $47_n$) through the respective DC/DC converter/power source supply units $39_1$ to $39_n$, $49_1$ to $49_n$.

Similarly, the disk unit $33_1$ is also wired from a second source supply system $81_2$ for supplying power from a first power source 83 and second power source 85 (which supply AC power of 200V or 400V as industrial power) to a power source circuit $35_2$, and the to respective disks ($37_1$ to $37_n$, $47_1$ to $47_n$) through the respective DC/DC converter/power source supply unit ($39_1$ to $39_n$, $49_1$ to $49_n$). In other words, in the present embodiment, the power supply system for supplying power from the power source to the respective disks ($37_1$ to $37_n$, $47_i$ to $47_n$) is duplicated with the first source supply system $81_1$ and second source supply system $81_2$. The reasons this source supply system is duplicated is to enable the operation of one power source facility even when the other power source facility malfunctions during a power source failure of the power source facility or the like. Further, the same applies when a failure occurs in either the AC/DC converter/power source supply unit $35_1$ or AC/DC converter/power source supply unit $35_2$ so as to enable the other to continue operating.

The plurality of hard disks $37_1$ to $37_n$ disposed in an array for storing data are separated in disposed respectively in groups. A single DC/DC converter/power source supply unit $39_1$ to $39_n$ is disposed to a hard disk group in one group in the vicinity thereof in association with the respective hard disk groups. A redundant DC/DC converter/power source supply unit 39R is further disposed in the plurality of DC/DC converter/power source supply units $39_1$ to $39_n$ at a ratio of one redundant DC/DC converter/power source supply unit 39R each plurality of DC/DC converter/power source supply units $39_1$ to $39_n$.

The adoption of a configuration of providing one redundant power supply unit 39R to a plurality of normal power supply units $39_1$ to $39_n$ wastes less power source capacity in comparison to the redundant configuration of mounting two identical power sources having an electrical capacity corresponding to the number of loaded hard disks. Further, by adding or removing the normal and redundant DC/DC converter/power source supply units $39_1$ to $39_n$, 39R simultaneously with the addition or removal of hard disks, it is possible to realize the optimum power source cost in the configuration of hard disks.

The DC/DC converter/power source supply units $39_1$ to $39_n$ convert the DC voltage supplied from the AC/DC converter/power source supply unit $35_1$ through the first source supply system $81_1$, or the DC voltage supplied from the AC/DC converter/power source supply unit $35_2$ through the second source supply system $81_2$ into a prescribed voltage (drop), and supplies this to the hard disks $37_1$ to $37_n$ of the respectively corresponding group families. The respective DC/DC converter/power source supply unit $39_1$ to $39_n$ for supplying power to the hard disks $37_1$ to $37_n$ have sufficient output capacity for driving all hard disks $37_1$ to $37_n$ of the associated group family so that the operation of the hard disks $37_1$ to $37_n$ is not influenced even when one DC/DC converter/power source supply unit malfunctions and the output is stopped. The redundant DC/DC converter/power source supply unit 39R also has the same capacity as the DC/DC converter/power source supply units $39_1$ to $39_n$. Therefore, even when a failure occurs to the DC/DC converter/power source supply units $39_1$ to $39_n$, the hard disks $37_1$ to $37_n$ will be able to operate normally be being supplied power from the redundant DC/DC converter/power source supply unit 39R having the same capacity as the DC/DC converter/power source supply units $39_1$ to $39_n$.

The output voltage of the normal DC/DC converter/power source supply units $39_1$ to $39_n$ and redundant DC/DC converter/power source supply unit 39R is fixed to a given value in the operating voltage span of the load. Here, the output voltage of the normal DC/DC converter/power source supply units $39_1$ to $39_n$ is set to be higher than the output voltage of the redundant DC/DC converter/power source supply unit 39R. For instance, in the DC/DC converter/power source supply units $39_1$ to $39_4$, if the output voltage of the normal DC/DC converter/power source supply unit $39_1$ is set to V1, the output voltage of the normal DC/DC converter/power source supply unit $39_2$ is set to V2, the output voltage of the normal DC/DC converter/power source supply unit $39_3$ is set to V3, the output voltage of the normal DC/DC converter/power source supply unit $39_4$ is set to V4, and the output voltage of the redundant DC/DC converter/power source supply unit 39R is set to Vext, the relationship of the output voltages will become V1≈V2≈V3≈V4>Vext.

As a result of the foregoing setting, during normal operation, power is supplied to the hard disks 37 from only the normal DC/DC converter/power source supply unit 39 with the highest voltage. When a failure occurs in any one of the normal DC/DC converter/power source supply units 39 and the output voltage drops, the redundant DC/DC converter/power source supply unit 39R will have a higher voltage, and the power supply source is switched to the redundant DC/DC converter/power source supply unit 39R. As a result, since the redundant DC/DC converter/power source supply unit 39R will be used only when a failure occurs in the normal DC/DC converter/power source supply unit 39, the redundant DC/DC converter/power source supply unit 39R is not used normally. Thus, the estimated usable period of the redundant DC/DC converter/power source supply unit 39R will become longer. And it is also possible to reduce the possibility of the normal DC/DC converter/power source supply units $39_1$ to $39_4$ and redundant DC/DC converter/power source supply unit 39R simultaneously failing.

Further, for instance, when supplying power to the hard disks $37_1$ to $37_8$ as the memory mediums through the power source supply paths 60 and 61 from the normal DC/DC converter/power source supply units (normal power sources) 39 and redundant DC/DC converter/power source supply unit (redundant power source) 39R, the DC resistance and impedance of the respective conducts of the power source supply paths 60 and 61 are different. When supplying power through this conduct, if the normal DC/DC converter/power source supply unit 39 and redundant DC/DC converter/power source supply unit 39R are outputting at the same voltage setting, power is foremost supplied from the conduct (power source supply path 60) having lower DC resistance and impedance, but a voltage drop will occur in the former DC resistance and impedance if the load current increases. Thus, the apparent voltage of the normal DC/DC converter/power source supply unit 39 will become lower than the voltage of the redundant DC/DC converter/power source supply unit 39R, and, since it will not be possible to supply power from the conduct 60, power will be supplied from the redundant power source supply path 61. Nevertheless, even if power is supplied from the redundant power source supply path 61, the same voltage drop as the power source supply path 60 will occur, and, since it will not be possible to supply power from the redundant power source supply path 61, the power source supply path is switched to the power source supply path 60.

When the foregoing switching operation of the power source supply path is repeatedly performed, a ripple current will occur in the respective power source supply paths 60, 61, and cross talk noise can easily occur in the adjacent pattern (signal) of the power source supply paths 60, 61. Further, a ripple voltage will also occur in the hard disks $37_1$ to $37_8$. Nevertheless, with the present invention, since it is possible to provide in advance a voltage difference in consideration of the voltage drop that may occur in the power source supply paths 60, 61 to the normal DC/DC converter/power source supply unit (normal power source 1) 39 and redundant DC/DC converter/power source supply unit (redundant power source) 39R, regardless of whether the normal DC/DC converter/power source supply unit (normal power source 1) 39 and redundant DC/DC converter/power source supply unit (redundant power source) 39R are normally operating or when one is malfunctioning, by using one power source supply path among the power source supply paths 60, 61, it is possible to uniquely use the power supply circuits 60, 61 during normal operation or failure. Thus, it is therefore possible to suppress the ripple current of the respective components and prevent crosstalk noise from generating in the adjacent pattern (signal) of the power source supply paths 60, 61.

Conventionally, for example, thirty-two hard disks formed one group family, but in the present embodiment, eight hard disks form one group family. The DC/DC converter/power source supply unit 39 adopts a system of supplying power to eight hard disks with a single DC/DC converter/power source supply unit 39, and one DC/DC converter/power source supply unit 39 is added for each addition of 8n (n is the number of hard disks)+1 hard disks.

For example, when including 8n (n is the number of hard disks)+1 hard disks 37, even when only one hard disk 37 is mounted in the last group family, one DC/DC converter/power source supply unit 39 is added. If thirty-two hard disks form one group family as conventionally, the electrical capacity to be supplied to the thirty-one hard disks excluding the one hard disk to be loaded will become excess electrical capacity. Nevertheless, in this embodiment, since one group family is limited to eight disks, the excess electrical capacity can be maintained to be seven hard disks or less, and it is possible to significantly reduce such excess electrical capacity in comparison to conventional apparatuses.

Further, the DC/DC converter/power source supply unit 39, as described above, has sufficient output capacity for driving all hard disks 37 of the associated group family so that the operation of hard disks will not be influenced even if one DC/DC converter/power source supply unit 39 malfunctions and the output is stopped. By adopting a system of supplying power with one DC/DC converter/power source supply unit 39 to eight hard disks, even if a failure such a short-circuit occurs in the DC/DC converter/power source supply unit 39, it is possible to suppress the flow of current to eight hard disks worth, and not thirty-two hard disks worth. Moreover, it is also possible to suppress the number of hard disks that cannot be used to eight hard disks, and not thirty-two hard disks 37.

The redundant DC/DC converter/power source supply unit 39R, as shown in FIG. 2, is provided at a ratio of one redundant DC/DC converter/power source supply unit 39R for every four normal DC/DC converter/power source supply units. One redundant DC/DC converter/power source supply unit 39R is added each time 4m (m is the number of normal DC/DC converter/power source supply units 39)+1 is added.

The reason the redundant unit is provided at a ratio of one redundant unit for each four normal units is because this is a suitable ratio for enabling the collective spin-up of all hard disks by supplying power from the redundant DC/DC converter/power source supply unit 39R in addition to the normal DC/DC converter/power source supply units 39 upon the activation (spin-up) of the hard disks 37.

The electrical capacity of the normal DC/DC converter/power source supply unit 39 is an electrical capacity enabling the reading and writing of eight hard disks to become the load. The power will fall short in the activation (spin-up) that consumes more power than reading and writing. In other words, for example, the power required for eight hard disks to performing reading/writing hard disks is set to 8, and the power required for the spin-up is set to 10. Since the normal DC/DC converter/power source supply unit 39 and redundant DC/DC converter/power source supply unit 39R are both configured to supply power required for eight hard disks to performing the operation of reading and writing, the electrical capacity thereof is set to 8. Here, if only the normal DC/DC converter/power source supply unit 39 is used, since the electrical capacity thereof is 8, it is not possible to cover the power of 10 required for the spin-up of the eight hard disks. Thus, it is necessary to spin-up the eight hard disks in several occasions since it is not possible to do it at once.

During the spin-up, if the redundant DC/DC converter/power source supply unit 39R can be used in addition to the normally used DC/DC converter/power source supply units 39, it is possible to add the power source of the redundant DC/DC converter/power source supply unit 39R to the normal DC/DC converter/power source supply unit 39 and supply such power source to the hard disks. For example, the electrical capacity of the normal DC/DC converter/power source supply unit 39 and redundant DC/DC converter/power source supply unit 39R is set to 8, and the power required for the spin-up of the eight hard disks is set to 10. Further, when employing a configuration where one redundant DC/DC converter/power source supply unit 39R is loaded for n number of normal DC/DC converter/power source supply units 39, when seeking n from the following formula of 8(n+1)=10n, n=4, and one redundant DC/DC converter/power source supply unit 39R will be mounted for four normal DC/DC converter/power source supply units 39. According to this configuration, one normal DC/DC converter/power source supply unit 39 is able to operate eight hard disks, and, since power is supplementarily supplied from the redundant DC/DC converter/power source supply unit 39R to the four normal DC/DC converter/power source supply units 39 as described above, it is possible to spin-up the thirty-two hard disks 32 (8×4 hard disks) at once.

As described above, the redundant DC/DC converter/power source supply unit 39R is provided at a ratio of one redundant DC/DC converter/power source supply unit 39R to four DC/DC converter/power source supply units 39. The configuration of providing one redundant DC/DC converter/power source supply unit 39R to four normal DC/DC converter/power source supply units 39 will be considered as one power source group. In other words, the configuration of m number of normal DC/DC converter/power source supply units 39 and one redundant DC/DC converter/power source supply unit 39R will be a power source group 51.

As shown in FIG. 4, an ECC (Error Check and Correct Memory) group is not configured in a single power source group. For example, when configuring 3D+1P (3 data+1 parity), a group family of the associated hard disks 37 of the four power source groups is picked up one by one to configure one ECC group 50. According to this configuration, even if a failure occurs in one power source group, it is possible to recover data. Reliability in the protection of data is thereby improved.

As shown in FIG. 5, the DC/DC converter/power source supply unit 39, in addition to an input unit and output unit, has a normal system/redundant system identification bit 100 as an I/O system capable of sending and receiving control signals. In the backboard, this I/O system is connected openly if a normal DC/DC converter/power source supply unit 39 and connected to the ground if a redundant DC/DC converter/power source supply unit 39R. For instance, by allocating "ground/open" at the backboard side, the power source itself will be able to distinguish whether it is a normal unit or redundant unit and switch the output accordingly. Switching of the output of a normal unit and redundant unit can be facilitated simply by changing the allocation at the backboard side. The same power source can be used for the normal unit and redundant unit, and it is possible to reduce the number of components.

The respective DC/DC converter/power source supply units 39, 39R have a current backflow prevention circuit or current backflow prevention element (diode D for example) and a current limiting circuit or current limiting element (fuse F for example) in the power output unit. By including the fuse F, even if a failure such as a short circuit occurs inside the hard disks and backboard, the respective DC/DC converter/power source supply units 39, 39R will be protected, and it is possible to continue supplying power from the redundant DC/DC converter/power source supply unit 39R to the other hard disk groups.

Further, even when a failure such as a GND short occurs in the DC/DC converter of the DC/DC converter/power source supply unit 39, current will not be absorbed from the normal DC/DC converter/power source supply unit (normal power source 1) 39 or redundant DC/DC converter/power source supply unit (redundant power source) 39R OR-connected to the output unit with the current backflow prevention element provided to the output unit, and the external (output unit) voltage will be maintained thereby. Further, since the fuse (current limiting element) F disposed at the front level of the OR diode (current backflow prevention element) provided to the input unit will fuse (limit the current), voltage of the two input unit can also be maintained.

Further, as a result of the diode D of the input unit, current will not flow to the remaining input unit among the two input units when one input unit is subject to a GND short, and there will be no influence other than on the input unit that was subject to a failure such as a short circuit. Thus, even during a failure in the input unit, DC/DC converter/power source supply unit (normal power source 1) 39 and memory mediums such as the hard disks 37 and GND short of the power supply wiring, there will be no influence on the operation of the other power sources and hard disks, and the continuous operation of the system is thereby enabled.

As shown in FIG. 6, each disk unit 33 is separately provided with a hard disk status display light-emitting diode (LED) 110 as a display device. By illuminating or not illuminating this LED, it is possible to visually confirm the status of the hard disks 37.

When the normal DC/DC converter/power source supply units 39 are all operating normally after the power of the disk subsystem is turned on, by supplying the power of the hard disk state display LED 110 from the DC/DC converter/power source supply unit 39, it is possible to display the status of the hard disks 37 with the LED 110 while the DC/DC converter/power source supply unit 39 is operating normally. Here, the LED 120 of the redundant DC/DC converter/power source supply unit 39R is not illuminated.

Nevertheless, as shown in FIG. 6, if the LED 110 is connected behind the normal DC/DC converter/power source supply unit 39, when a failure occurs in the normal DC/DC converter/power source supply unit 39 and the LED 110 cannot be controlled, it is not possible to display the status of the hard disks 37. Here, information is reported to the upper-level control unit based on an alarm signal from the normal DC/DC converter/power source supply unit 39, the control unit that received the report switches the switch 130 of the LED switching unit, and switches the LED control of the failed normal DC/DC converter/power source supply unit 39 to the LED control of the redundant DC/DC converter/power source supply unit 39R. The LED of the redundant DC/DC converter/power source supply unit 39R can be used to show the operational status of the hard disks 37. According to this configuration, even when the normal DC/DC converter/power source supply unit 39 cannot be used, it is possible to visually confirm the status of the hard disks 37, and maintenance errors in the replacement of hard disks can be prevented thereby.

Or, as shown in FIG. 7, when directly supplying driving power to the LED 110 from the AC/DC converter/power source supply unit 35, it will not be affected even when a failure occurs in the DC/DC converter/power source supply unit 39. According to this configuration, even when the normal DC/DC converter/power source supply unit 39 cannot be used, it is possible to visually confirm the status of the hard disks 37, and maintenance errors in the replacement of hard disks can be prevented thereby. Incidentally, the hard disks 37 are able to receive the supply of power from the redundant DC/DC converter/power source supply unit 39R.

Further, it is possible to control the output voltage of the normal DC/DC converter/power source supply unit 39 and redundant DC/DC converter/power source supply unit 39R based on the commands from the hard disk control logical units 73, 75 built in the disk control logical unit 71. For instance, in order to know the operational voltage margin of the hard disks 37, an up/down signal is output from the hard disk control logical unit 73, 75 to the normal DC/DC converter/power source supply units 39 and redundant DC/DC converter/power source supply unit 39R, and, when it is an up signal, the output voltage of the normal DC/DC converter/power source supply units 39 and redundant DC/DC converter/power source supply unit 39R can be increased 5% from the normal output voltage, and, when it is a down signal, the output voltage of the normal DC/DC converter/power source supply units 39 and redundant DC/DC converter/power source supply unit 39R can be reduced 5% from the normal output voltage so as to change the output voltage setting.

Here, the output voltage of the normal DC/DC converter/power source supply unit (normal power source) 39 is set to be higher than the output voltage of the redundant DC/DC converter/power source supply unit (redundant power source) 39R, and, since power is supplied from the normal DC/DC converter/power source supply unit (normal power source) 39 to the load, if the output voltage of the normal DC/DC converter/power source supply unit (normal power source) 39 is reduced first, there may be cases where the output voltage of the normal DC/DC converter/power source supply unit (normal power source) 39 will be set to be lower than the redundant DC/DC converter/power source supply unit (redundant power source) 39R. Here, since the redundant DC/DC converter/power source supply unit (redundant power source) 39R supplies power to all hard disks 37, power may be supplied to the load beyond the tolerable output current, and the redundant DC/DC converter/power source supply unit (redundant power source) 39R will output excess current and become inoperable.

In order to prevent this from happening, in the present embodiment, the output voltage of the redundant DC/DC converter/power source supply unit (redundant power source) 39R is reduced before the normal DC/DC converter/power source supply unit (normal power source) 39, and the output voltage of the normal DC/DC converter/power source supply unit (normal power source) 39 is reduced on the condition that the output voltage of the redundant DC/DC converter/power source supply unit (redundant power source) 39R becomes 5% lower than the output voltage of the normal power source and is stabilized.

Contrarily, when increasing the reduced output voltage, the output voltage of the redundant DC/DC converter/power source supply unit (redundant power source) 39R is increased after the output voltage of the normal DC/DC converter/power source supply unit (normal power source) 39 is made to be a normal voltage or after it is increased. By employing this method, each power source will be set a different power source voltage, and it is possible to safely change the setting of the output voltage of the power sources connected with a redundant configuration of m-to-1.

Further, as shown in FIG. 1, the hard disk drivers $40_1$ to $40_n$, $41_1$ to $41_n$ have a plurality of power supply malfunction detection units $42_1$ to $42_n$, $43_1$ to $43_n$. These power supply malfunction detection units $42_1$ to $42_n$ detect any malfunction in the AC/DC converter/power source supply unit $35_1$ (and/or $35_3$) and first power source 83 through the first source supply system $81_1$, and reports the detection result thereof to the power source malfunction monitoring units $77_1$ to $77_r$ in the hard disk control logical unit.

The power supply malfunction detection units $42_1$ to $42_n$ also detect any malfunction in the AC/DC converter/power source supply unit $35_2$ (and/or $35_4$) and second power source 85 through the second source supply system $81_2$, and reports the detection result thereof to the power source malfunction monitoring units $77_1$ to $77_n$ in the hard disk control logical unit. The power supply malfunction detection units $42_1$ to $42_n$ also detect any malfunction in the respective DC/DC converter/power source supply units ($39_1$ to $39_n$) and report the detection result thereof to the power source malfunction monitoring units $77_1$ to $77_n$ in the hard disk control logical unit.

The power supply malfunction detection units $43_1$ to $43_n$ also perform the same detection operation as the power supply malfunction detection units $42_1$ to $42_n$. In other words, the power supply malfunction detection units $43_1$ to $43_n$ detect any malfunction in the AC/DC converter/power source supply unit $35_1$ (and/or $35_3$) and first power source 83 through the first source supply system $81_1$, and report the detection result thereof to the power source malfunction monitoring units $79_1$ to $79_n$ in the hard disk control logical unit. The power supply malfunction detection units $43_1$ to $43_n$ also detect any malfunction in the AC/DC converter/power source supply unit $35_2$ (and/or $35_4$) and second power source 85 through the second source supply system $81_2$, and report the detection result thereof to the power source malfunction monitoring units $79_1$ to $79_n$ in the hard disk control logical unit. The power supply malfunction detection units $43_1$ to $43_n$ also detect any malfunction in the respective DC/DC converter/power source supply units ($39_1$ to $39_n$) and report the detection result thereof to the power source malfunction monitoring units $79_1$ to $79_n$ in the hard disk control logical unit.

As evident from the above, the detection of malfunctions by the power supply malfunction detection units $42_1$ to $42_n$, $43_1$ to $43_n$ and the monitoring of power source by the power source malfunction monitoring units ($77_1$ to $77_n$, $79_1$ to $79_n$) are also duplicated. Further, the hard disk control logical units 73, 75 monitor the failure information of the respective power sources, and, when there is a malfunction, the location of malfunction is reported to the service processor 65 via the control interface 64 and reported to the maintenance center via the service processor 65 so as to notify the failure, and request the replacement of the failed components. As a result, reliability in monitoring the power source can be improved.

Next, the respective components configuring the disk control logical unit are explained. In the hard disk control logical unit 73 configuring the disk control logical unit 71, the power source malfunction monitoring unit $77_1$ inputs the detection signal from the power supply malfunction detection unit $42_1$ of the disk units $33_1$ and executes prescribed arithmetic processing. Together with this, the power source malfunction monitoring unit $77_1$ outputs a drive command signal/drive stop command signal to the respective disks ($37_1$ to $37_n$) so as to control the operation such as the activation/stop of the respective disks ($37_1$ to $37_n$).

In the disk control logical unit 75 configuring the disk control logical unit 71, the power source malfunction monitoring unit $79_1$ also, as with the power source malfunction monitoring unit $77_1$, inputs the detection signal from the power supply malfunction detection unit $43_1$ of the disk unit $33_1$ and executes prescribed arithmetic processing. Together with this, the power source malfunction monitoring unit $79_1$ outputs a drive command signal/drive stop command signal to the respective disks ($37_1$ to $37_n$) so as to control the operation such as the activation/stop of the respective disks ($37_1$ to $37_n$). Incidentally, the configuration of the disk control logical/power source malfunction monitoring units $77_2$ to $77_n$ and the configuration of the disk control logical/power source malfunction monitoring units $79_2$ to $79_n$ are the same as above, and the detailed explanation thereof is omitted.

The power source malfunction monitoring unit $77_1$, power source malfunction monitoring unit $77_2$, power source malfunction monitoring unit $77_n$, power source malfunction monitoring unit $79_1$, power source malfunction monitoring unit $79_2$, and power source malfunction monitoring unit $79_n$ send and receive mutually required data by respectively communicating with an upper-level control logical unit not shown.

Although the preferred embodiments of the present invention were described above, these embodiments are merely exemplifications for explaining the present invention, and are not intended to limit the scope of the present invention to such embodiments. The present invention may be implemented in various other modes.

What is claimed is:

1. A storage apparatus, comprising:
   a plurality of memory medium groups each of which comprising a plurality of memory mediums;
   a memory medium driver for driving the plurality of the memory mediums comprised in all of the memory medium groups;
   a plurality of DC/DC converter/power supply units each disposed in correspondence with only one of the memory medium groups for supplying power to each memory medium belonging to said only one memory medium group via a respective power supply path;

a redundant DC/DC converter/power supply unit which is respectively connected in parallel with each of said plurality of DC/DC converter/power supply units to each memory medium belonging to any of the memory medium groups via a redundant power supply path and is configured to supply power only to each memory medium disposed in correspondence with one of the plurality of DC/DC converter/power supply units which has a malfunction occurring therein;

a plurality of display devices each of which respectively receives power from one of said plurality of DC/DC converter/power supply units and displays a status of said only one memory medium group which is disposed in correspondence with said one power supply unit;

a redundant display device connected to said redundant power supply unit with said redundant power supply unit as a power supply source;

a malfunction detection unit for outputting an alarm signal upon detecting said malfunction in said one power supply unit; and a display device switching control unit for connecting said only one memory medium group which is connected to said one power supply unit subject to said malfunction to said redundant display device, in response to an alarm signal from said malfunction detection units wherein each of said plurality of DC/DC converter/power supply units and said redundant power supply unit includes either an identification bit for identification as a normal power source that supplies continuous power to the memory mediums belonging to said only one memory medium group, or an identification bit for identification as a redundant power source that supplies power during said malfunction in said one power supply unit.

2. The storage apparatus according to claim 1, wherein an output voltage of said redundant power supply unit is set to be lower than an output voltage of each of said plurality of DC/DC converter/power supply units.

3. The storage apparatus according to claim 2, further comprising a plurality of display devices each for displaying a status of said only one memory medium group which is disposed in correspondence with a respective one of the plurality of DC/DC converter/power supply units; wherein said plurality of display devices receives a power supply from a power source that is different from a power source of said plurality of DC/DC converter/power supply units.

* * * * *